United States Patent [19]

Ketcham, Sr.

[11] Patent Number: 5,097,251

[45] Date of Patent: Mar. 17, 1992

[54] BRAKE LIGHT APPARATUS

[76] Inventor: Gerald A. Ketcham, Sr., R.D. #8 Box 268A Cole Rd., Meadville, Pa. 16335

[21] Appl. No.: 673,313

[22] Filed: Mar. 22, 1991

[51] Int. Cl.⁵ .............................. B60Q 1/44
[52] U.S. Cl. .................... 340/479; 340/464; 200/61.89
[58] Field of Search ........... 340/464, 467, 473, 479; 200/61.89; 362/80, 81, 82, 83

[56] References Cited

U.S. PATENT DOCUMENTS 1,927,322  9/1933  Peacock ..................... 340/479
4,924,207  5/1990  Lariscy ...................... 200/61.89

Primary Examiner—Jin F. Ng
Assistant Examiner—Dov Popovici
Attorney, Agent, or Firm—Leon Gilden

[57] ABSTRACT

A brake light organization is arranged for mounting to all-terrain vehicle structures to alert drivers rearwardly of a vehicle as to application of brakes and terrain. The organization includes a stop light assembly that is actuated, wherein the organization is mounted to a frame of an associated all-terrain vehicle.

5 Claims, 4 Drawing Sheets

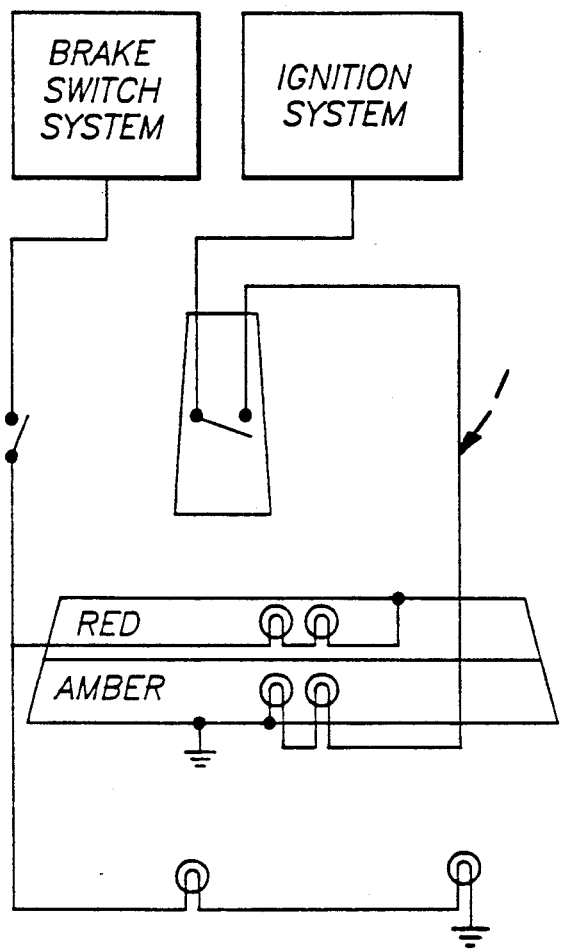
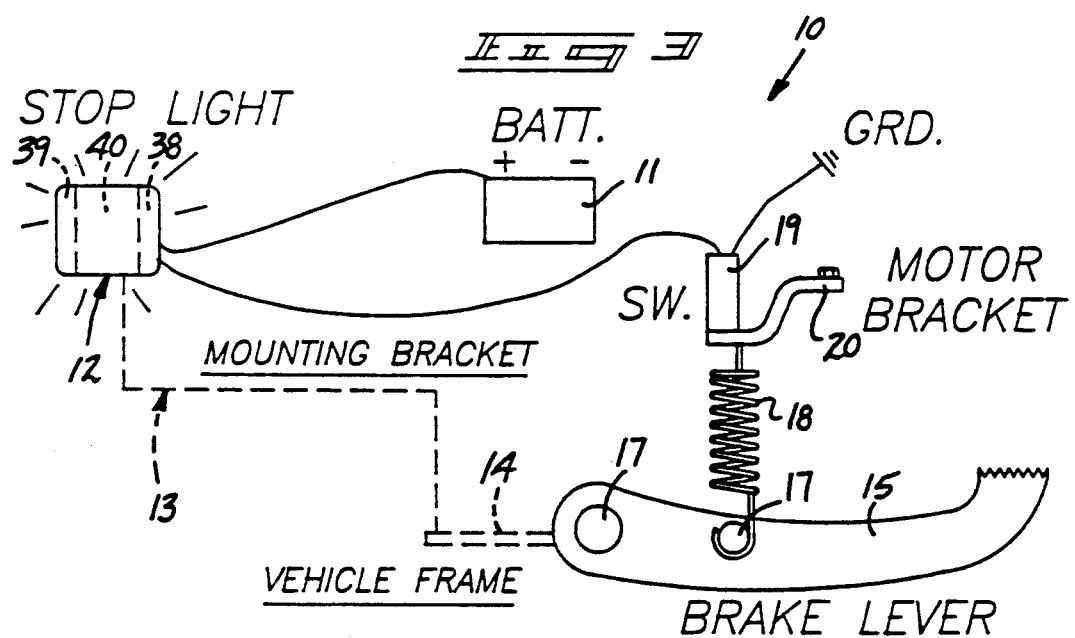

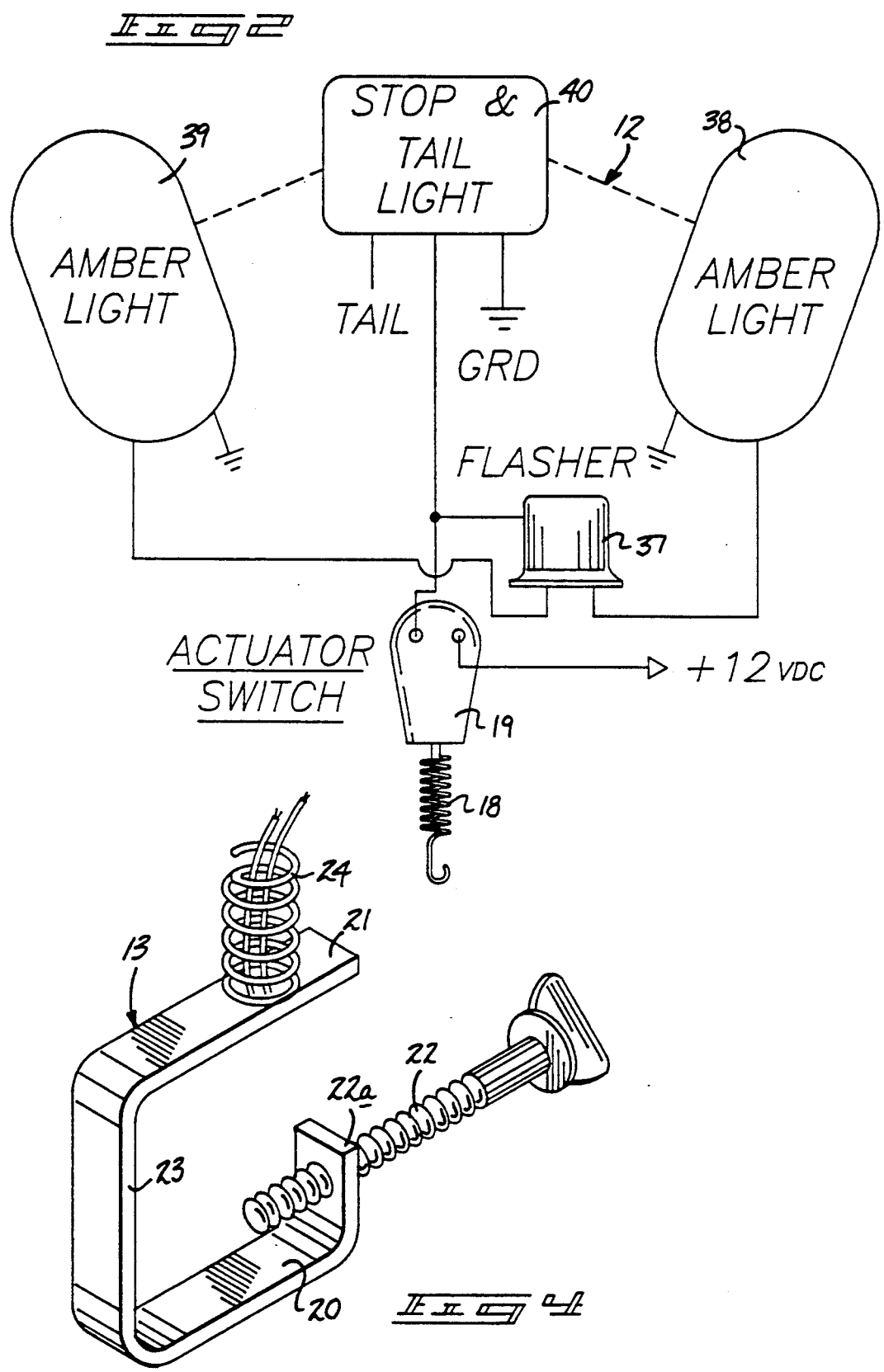

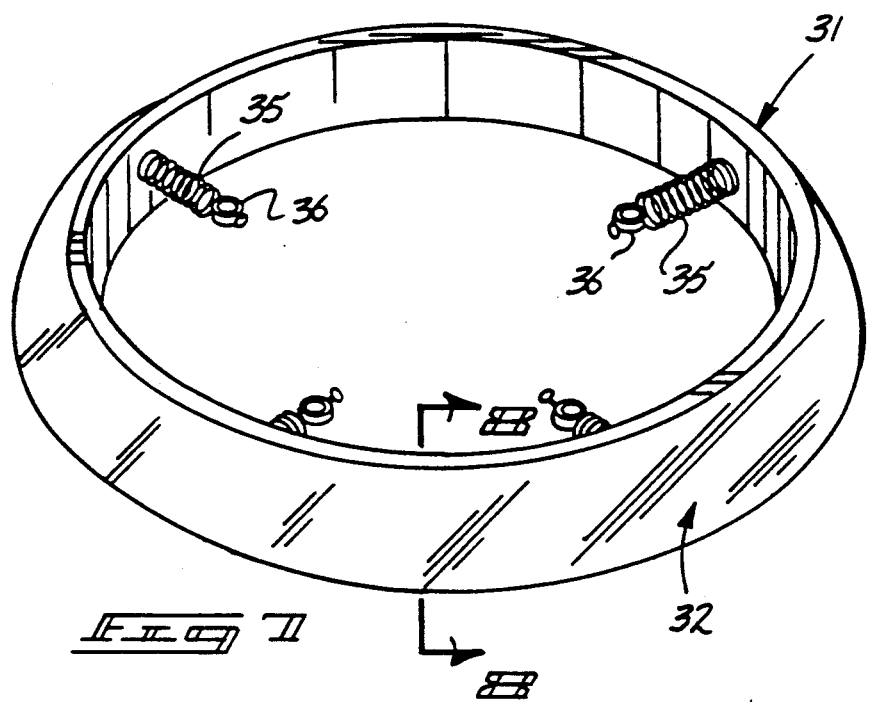
FIG 7
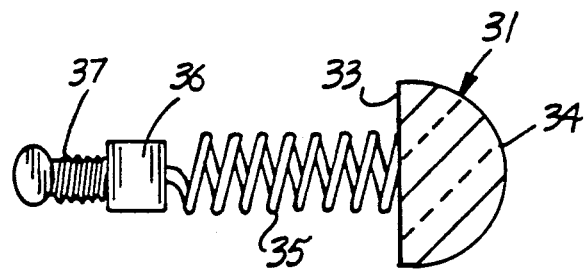
FIG 8
FIG 9
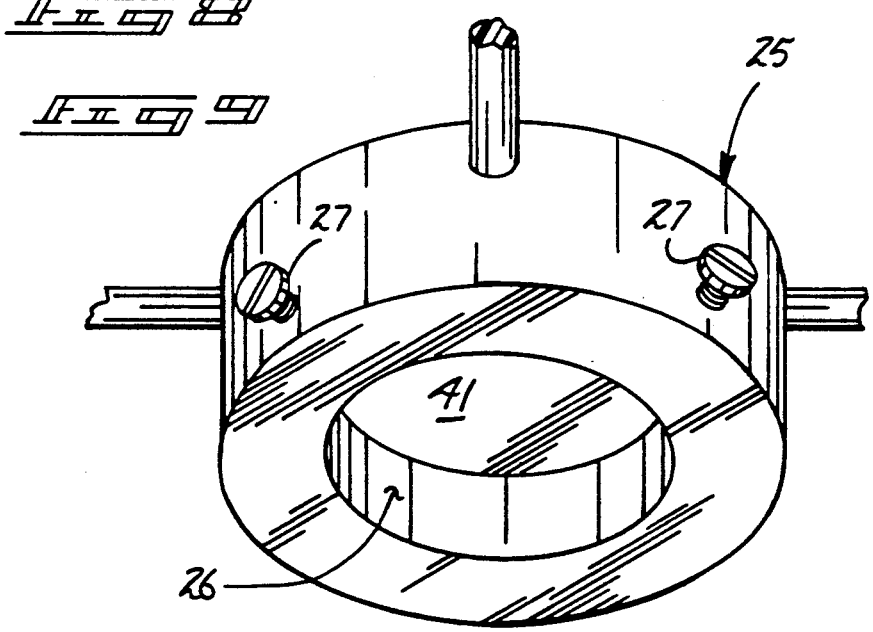

BRAKE LIGHT APPARATUS

BACKGROUND OF THE INVENTION

1. Field of the Invention

The field of invention relates to brake light apparatus, and more particularly pertains to a new and improved brake light apparatus mounted to an associated all-terrain vehicle frame.

2. Description of the Prior Art

All-terrain vehicles are utilized frequently through various terrain wherein drivers rearwardly of a lead vehicle are frequently not aware of the lead vehicle's intentions, such as stopping and the like. The use of brake light apparatus, while available in the prior art, has not heretofore been particularly tailored to all-terrain vehicles and their particular driving terrain or geography. Examples of prior art include U.S. Pat. No. 4,894,640 to Beasley utilizing a signal system for automotive vehicles. An amber light is operated in cooperation with an accelerator pedal with a red light of the brake light organization cooperative with a brake light switch of the vehicle.

U.S. Pat. No. 4,703,398 to Huth, et al. sets forth a brake light vehicle mounted within a particularly configured housing for mounting to a motor vehicle for securement to the rear window surface of the associated vehicle.

U.S. Pat. No. 4,663,609 to Rosario and 4,843,369 to Gimenez, et al. are further examples of motor vehicle brake light organizations and electrical circuitry therefore.

As such, it may be appreciated that there continues to be a need for a new and improved brake light apparatus as set forth by the instant invention which addresses both the problems of ease of use as well as effectiveness in construction for mounting to all-terrain vehicles and in this respect, the present invention substantially fulfills this need.

SUMMARY OF THE INVENTION

In view of the foregoing disadvantages inherent in the known types of brake light apparatus now present in the prior art, the present invention provides a brake light apparatus wherein the same is arranged for retrofit and mounting to an associated all-terrain vehicle. As such, the general purpose of the present invention, which will be described subsequently in greater detail, is to provide a new and improved brake light apparatus which has all the advantages of the prior art brake light apparatus and none of the disadvantages.

To attain this, the present invention provides a brake light organization arranged for mounting to all-terrain vehicle structures to alert drivers rearwardly of a vehicle as to application of brakes and terrain. The organization includes a stop light assembly that is actuated, wherein the organization is mounted to a frame of an associated all-terrain vehicle.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved brake light apparatus which has all the advantages of the prior art brake light apparatus and none of the disadvantages.

It is another object of the present invention to provide a new and improved brake light apparatus which may be easily and efficiently manufactured and marketed.

It is a further object of the present invention to provide a new and improved brake light apparatus which is of a durable and reliable construction.

An even further object of the present invention is to provide a new and improved brake light apparatus which is susceptible of a low cost of manufacture with regard to both materials and labor, and which accordingly is then susceptible of low prices of sale to the consuming public, thereby making such brake light apparatus economically available to the buying public.

Still yet another object of the present invention is to provide a new and improved brake light apparatus which provides in the apparatuses and methods of the prior art some of the advantages thereof, while simultaneously overcoming some of the disadvantages normally associated therewith.

Still another object of the present invention is to provide a new and improved brake light apparatus wherein the same is arranged for mounting to an all-terrain vehicle utilizing light enhancing structure to alert rearwardly positioned vehicles of geographical conditions and intentions of a driver of a lead all-terrain vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic diagrammatic illustration of a prior art brake light apparatus.

FIG. 2 is a diagrammatic depiction of the organization of the instant invention.

FIG. 3 is a diagrammatic illustration of the organization in association with a brake light lever utilized by the instant invention.

FIG. 4 is an isometric illustration of the mounting clamp structure for mounting a stop light assembly, as is typically utilized by the instant invention.

FIG. 7 is an isometric illustration of the indicator ring utilized by the instant invention.

FIG. 8 is an orthographic view, taken along the lines 8—8 of FIG. 7 in the direction indicated by the arrows.

FIG. 9 is an isometric bottom view of the light and mounting housing utilized by the instant invention.

DESCRIPTION OF THE PREFERRED EMBODIMENT

Figure 5:
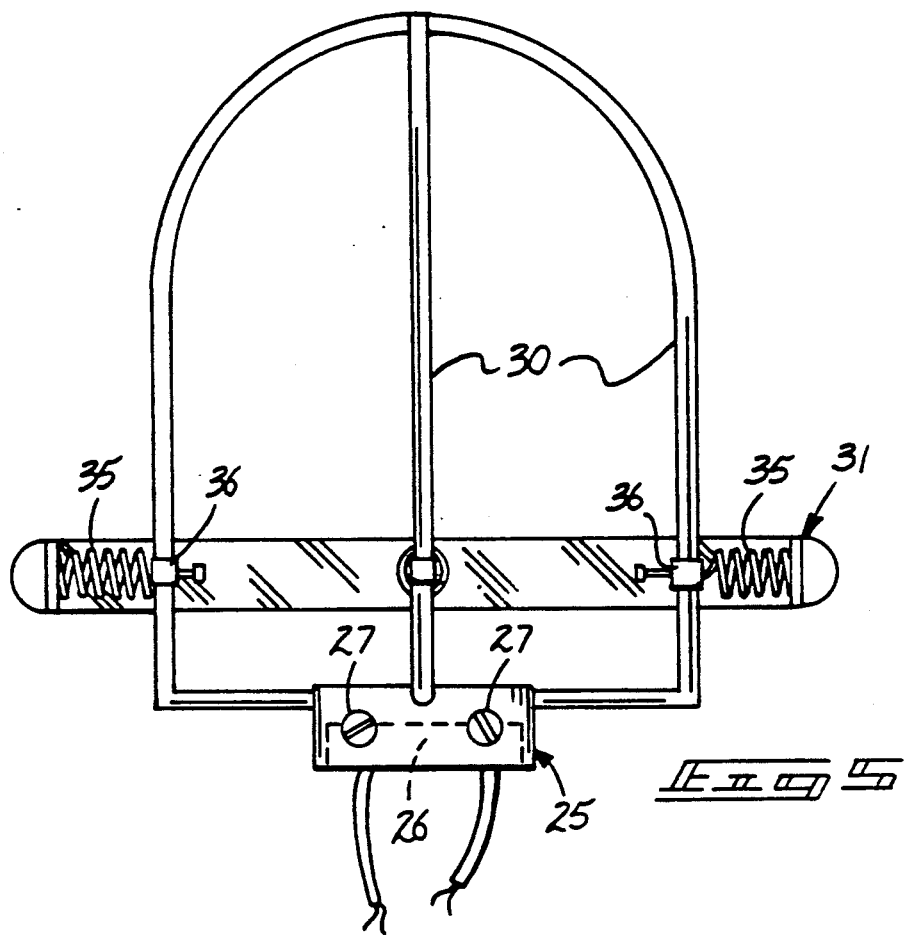
FIG. 5 is an orthographic side view of a lighted assembly cage structure utilized by the instant invention.
Figure 6:
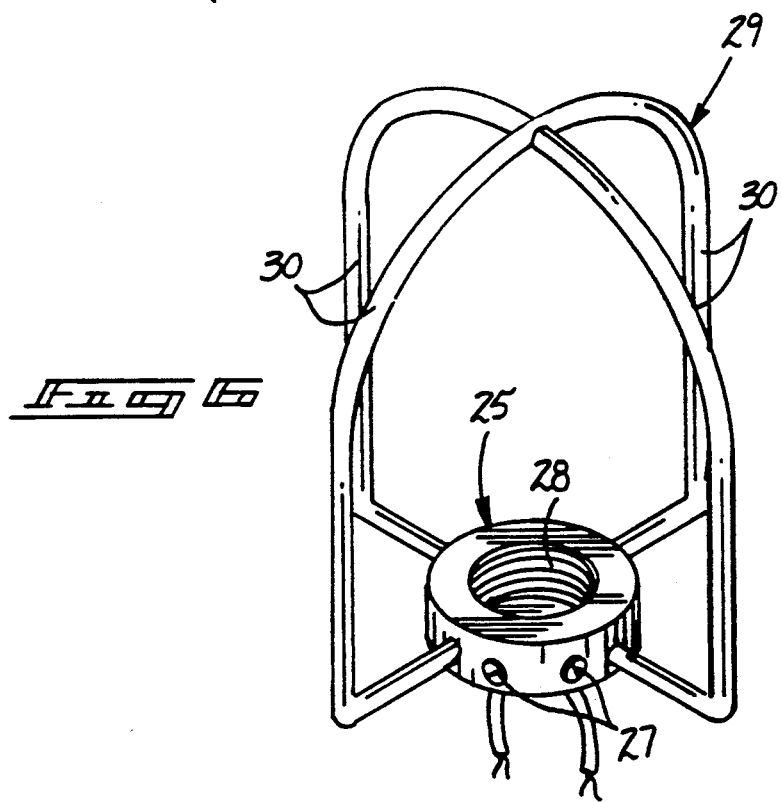
FIG. 6 is an isometric illustration of the light assembly cage structure utilized by the instant invention.

With reference now to the drawings, and in particular to FIGS. 1 to 9 thereof, a new and improved brake light apparatus embodying the principles and concepts of the present invention and generally designated by the reference numeral 10 will be described.

FIG. 1 sets forth a prior art brake light organization, as depicted in U.S. Pat. No. 4,894,640, utilizing a combination of amber and red lights cooperative with the accelerator and braking system of an associated automotive vehicle.

More specifically, the brake light apparatus 10 of the instant invention essentially comprises a system in electrical communication with a battery 11 of an associated all-terrain vehicle, wherein the battery 11 is directed to a stop light assembly 12 mounted to a vehicle frame 14 by a mounting bracket 13 (see FIG. 4). A brake lever 15 is pivotally mounted to the vehicle frame 14 about a brake lever pivot 16. A brake lever boss 17 is orthogonally mounted to the brake lever 15 between the pivot 16 and a forward terminal end of the lever 15 spaced from the pivot 16. A brake lever coil spring 18 is mounted at its lower end to the brake lever boss 17 and an upper end to a light actuator switch 19 that in turn is mounted to a bracket plate 20 mounted to an associated all-terrain vehicle.

FIG. 2 illustrates the contents of the light assembly 12 incorporating a first and second amber light 38 and 39 mounted to opposed sides of a central red light 40. A flasher unit 37 receives current through the switch 19 upon depressing the brake lever 15 to direct current to effect flashing of the amber lights 38 and 39, as well as effecting actuation of the stop and tail light 40.

FIG. 4 illustrates the use of a typical mounting bracket 13 for mounting to the vehicle frame 14, wherein the bracket includes a bottom bracket plate 20 spaced from and parallel a top bracket plate 21. A bracket base plate 23 is orthogonally directed between the top and bottom brackets and arranged parallel to a bracket leg 22a threadedly receiving a securement bolt 22 orthogonally therethrough, wherein the securement bolt 22 is orthogonally oriented relative to the bracket base plate 23 to mount the frame 14 between the bolt 22 and the base plate 23.

FIG. 5 illustrates the light mounting housing 25 formed of a generally cylindrical configuration to receive an upper terminal end of the light assembly mounting coil spring 24 that in turn has its lower terminal end mounted to the top bracket plate 21, as illustrated in FIG. 4. The light mounting housing 25 includes a spring receiving lower cylindrical chamber 26 (see FIG. 9), with a light bulb receiving internally threaded upper cylindrical chamber 28 coaxially aligned with and positioned overlying the lower cylindrical chamber 26. A separating web 41 separates the lower and upper chambers 26 and 28.

The light mounting housing 25 includes a cage member 29 integrally mounted and extending upwardly thereof, wherein the cage member 29 includes a plurality of parallel legs 30 defined by plural pairs of such legs 30 that are spaced symmetrically about the light mounting housing 25 arranged pairs, with each leg of each pair diametrically opposed relative to an opposing leg, with each leg pair oriented ninety degrees relative to an adjacent pair of the legs to define a generally encircling cage member 29.

An indicator ring 31 is fixedly mounted to the legs 30 of the cage member 29 and extends axially spaced from the cage 29. The indicator ring 31 includes a translucent outer ring 32 formed with a convex outer wall 34 and a planar cylindrical inner wall 33. The indicator ring 31 includes a plurality of mounting springs 35, each orthogonally mounted to the cylindrical inner wall 33 at a forward terminal end of each mounting spring 35, and a rear terminal end of each mounting spring 35 including a leg mounting cylinder 36, wherein each leg mounting cylinder is mounted in surrounding relationship relative to an associated leg 30. Upon undulation of the all-terrain vehicle about terrain of a rough contour, the translucent polymeric outer ring 32 will vibrate and thereby distort viewing of the light assembly 12 to provide enhanced warning to a rearwardly oriented driver of a further all-terrain vehicle about the terrain conditions of a lead all-terrain vehicle.

It should be further noted that the light mounting housing 25 may be removably but alternatively securably mounted to an upper terminal end of the light assembly mounting coil spring 24 by utilizing a plurality of locking bolts 27 radially directed through the light mounting housing projecting into the lower chamber to secure the upper terminal end of the light assembly mounting coil spring 24 therewithin. In this manner, the stop light assembly 12 may be removed from the bracket 13 as required for service and maintenance thereof.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A brake light apparatus comprising, in combination,
    a stop light assembly, the stop light assembly including a first amber light and a second amber light and a central red light mounted between the first amber light and the second amber light, and
    the stop light assembly mounted to a vehicle frame, and
    a brake lever mounted pivotally relative to the vehicle frame about a brake lever pivot, and
    a brake lever boss mounted medially of the brake lever adjacent the brake lever pivot, and
    a brake lever coil spring mounted to the brake lever boss at a lower terminal end of the brake lever coil spring, and
    the brake lever coil spring including an upper terminal end and further including a light actuator switch, and
    the upper terminal end of the brake lever coil spring mounted to the light actuator switch to effect actuation of the light actuator switch upon pivotment of the brake lever, and
    flasher unit means to effect flashing of the first amber light and the second amber light and illumination of the central red light upon pivotment of the brake lever, and
    wherein the stop light assembly includes a light mounting housing, the light mounting housing including a cylindrical lower chamber coaxially aligned with a cylindrical upper chamber, the lower chamber and the upper chambers separated by a central separating web, and a mounting bracket mounting the stop light assembly to the vehicle frame, the mounting bracket including a top plate, and a light assembly mounting coil spring mounted to the top plate, and a light assembly mounting coil spring including a light assembly mounting coil spring upper terminal end received within the lower chamber of the light mounting housing to accommodate vibration of the light mounting housing.

2. An apparatus as set forth in claim 1 including a cage member, the cage member fixedly mounted in surrounding relationship relative to the light mounting housing.

3. An apparatus as set forth in claim 2 wherein the cage member includes plural pairs of parallel legs, each leg of each pair diametrically aligned relative to an opposing leg of each pair and each leg pair oriented ninety degrees relative to an adjacent leg pair.

4. An apparatus as set forth in claim 3 wherein the cage member further includes a translucent outer ring, the translucent outer ring including a convex outer wall and a cylindrical inner wall, the cylindrical inner wall coaxially aligned relative to the lower chamber and the upper chamber of the light mounting housing, and a plurality of mounting springs, each mounting spring including a mounting spring forward terminal end, each forward terminal end fixedly mounted within the cylindrical inner wall of the translucent outer ring, and each mounting spring is radially oriented relative to the cylindrical inner wall, and each mounting spring including an inner terminal end, each inner terminal end mounted to a respective leg of the cage member to permit undulation of the translucent outer ring.

5. An apparatus as set forth in claim 4 wherein the light mounting housing includes a plurality of locking bolts radially directed into the light mounting housing and positioned within the lower chamber to secure the light assembly mounting coil spring to the light mounting housing.

* * * * *